(12) United States Patent
Kadota

(10) Patent No.: US 6,216,176 B1
(45) Date of Patent: Apr. 10, 2001

(54) METHOD OF PASSING RIGHT TO USE INPUT/OUTPUT PORT BETWEEN SOFTWARES

(75) Inventor: Masatoshi Kadota, Takahama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/162,152

(22) Filed: Sep. 29, 1998

(30) Foreign Application Priority Data

Sep. 30, 1997 (JP) .................................................. 9-265966
Nov. 6, 1997 (JP) .................................................. 9-304559

(51) Int. Cl.$^7$ .................................................. G06F 13/00
(52) U.S. Cl. .............................. 710/1; 710/129; 710/240; 710/36
(58) Field of Search ............................ 359/212; 558/296, 558/468; 709/321, 326, 327; 710/129–131, 200, 220, 240–244, 1–12, 36–40

(56) References Cited

U.S. PATENT DOCUMENTS

| 5,418,891 | * | 5/1995 | Yang | ..................................... 395/114 |
| 5,532,825 | * | 7/1996 | Lim et al. | ............................. 358/296 |
| 5,532,844 | * | 7/1996 | Kagami et al. | ....................... 358/468 |
| 5,819,112 | * | 10/1998 | Kusters | .................................. 710/36 |
| 5,982,614 | * | 11/1999 | Reid | ..................................... 361/686 |
| 6,002,508 | * | 12/1999 | Mai | ..................................... 359/212 |
| 6,134,608 | * | 10/2000 | Jacober et al. | .......................... 710/40 |

FOREIGN PATENT DOCUMENTS

0641114A1 * 1/1995 (EP) .

* cited by examiner

Primary Examiner—Christopher B. Shin
(74) Attorney, Agent, or Firm—Oliff & Berridge, PLC

(57) ABSTRACT

Usually, only a printer driver can use an I/O port LPT1 connected with a printer. Therefore, an operation system of a personal computer does not anticipate a scanner driver, for example, using the I/O port LPT1. However, according to the present invention, the scanner driver controls the operation system to put the printer driver into a pending condition so that the scanner driver can use the I/O port. Therefore, when the printer has both a printer function and a scanner function, the scanner driver can drive the printer as a scanner via the I/O port LPT1.

25 Claims, 7 Drawing Sheets

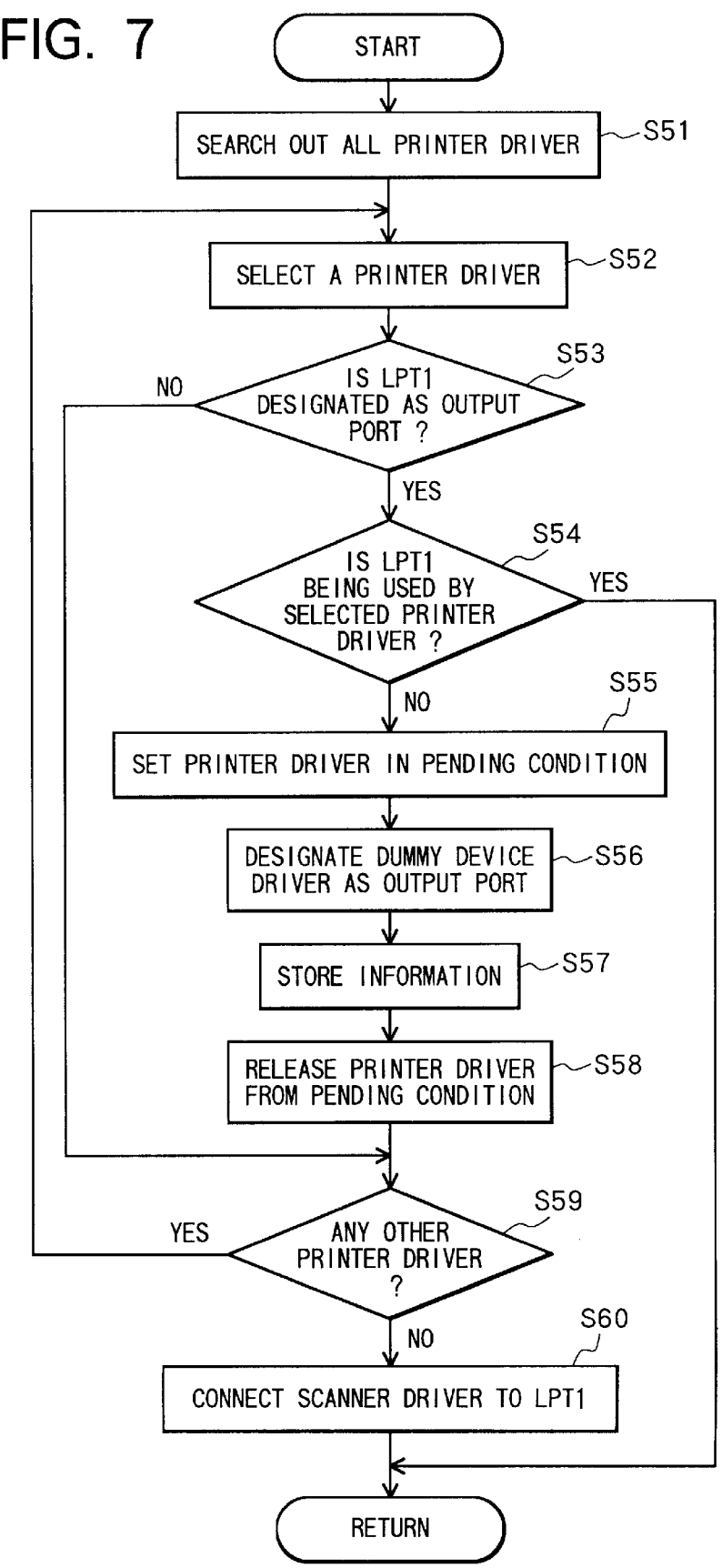

METHOD OF PASSING RIGHT TO USE INPUT/OUTPUT PORT BETWEEN SOFTWARES

BACKGROUND OF THE INVENTION

1. Field of the Invention

The present invention relates to a control unit used in a data processing device. The control unit controls an input/output port that the data processing unit uses to communicate with an external device. The present invention also relates to a method for switching input/output ports and to a storage medium storing a program for switching the input/output port.

2. Description of Related Art

There has been developed a variety of softwares for use in a data processing device. The data processing device includes a memory for storing the variety of softwares and an input/output ports for enabling the softwares to communicate with external devices, such as a printer and a scanner. Examples of the software include application softwares for executing processes using a screen and software drivers for driving the external devices via the input/output ports. Usually, the software drivers are individually installed on an operation system of the data processing device. Some of the softwares are designed to exclusively use only a certain designated input/output port. For example, only a printer driver for driving a printer is allowed to use a designated input/output port LPT1, for example. In this case, no other software can use the input/output port LPT1.

SUMMARY OF THE INVENTION

It is conceivable that the operation system be designed to command the printer driver to allow other softwares to use the input/output port LPT1.

However, improved external devices have been developed in recent years. When these different kinds of newly developed external devices are connected to a conventional data processing device, the operation system of the data processing device may not have information on the new external device. For example, a printer having both a printer function and a scanner function has been developed. When this kind of printer is connected to the input/output port LPT1 of the data processing device, then in terms of function, both a printer and a scanner are concurrently connected to the input/output port LPT1. In this case, in order to utilize both the scanner and printer functions of the printer, both a scanner driver and a printer driver need to use the input/output port LPT1 to communicate with the printer. However, as described above, the printer driver has the exclusive right to use the input/output port LPT1, and also the operation system does not anticipate to command the printer driver to pass the right to the scanner driver. Without the scanner driver being allowed to use the input/output port LPT1, the scanner function of the printer can never be used. The same problems arise for any other external devices or softwares not recognized by the operation system.

It is an objective of the present invention to overcome the above-described problems, and to provide a system that allows an input/output port to be used by softwares of the type not anticipated by an operation system.

In order to achieve the above and other objectives, there is provided a data transmission device including a first memory, a first input/output port, detecting means, and pending means. The first memory stores a plurality of softwares. The first input/output port is connectable to an external device. At least one of the plurality of softwares is designated to use the first input/output port to communicate with the external device via the first input/output port. The detecting means is provided for detecting the at least one of the plurality of softwares which is designated to use the first input/output port. The pending means sets the at least one of the plurality of softwares detected by the detecting means into a pending condition.

There is also provided a data transmission device including a first memory, a second memory, an input/output port, and detecting means. The first memory stores a first software and a second software. The second memory stores data. The input/output port is connectable with an external device. The first software and the second software are communicable with the external device via the input/output port. The detecting means detects whether or not the first software is presently using the input/output port to communicate with the external device. The second software transmits data to the external device via the input/output port when the first software is not presently using the input/output port. On the other hand, the second software transmits data to the second memory to store the data into the second memory when the first software is presently using the input/output port.

Further, there is provided a method of controlling a use of an input/output port by a plurality of softwares. The method includes the steps of a) detecting at least one of a plurality of softwares stored in a first memory, the at least one of the plurality of softwares being designated to use a first input/output port to communicate with the external device via first the input/output port, and b) setting the at least one of the plurality of softwares detected in step a) into a pending condition.

There is also provided a method of controlling a use of an input/output port by a plurality of softwares. The method includes the steps of a) detecting whether or not a first software is presently using an input/output port to communicate with an external device, b) controlling a second software to communicate with the external device via the input/output port when it is detected in the step a) that the first software is not presently using the input/output, and c) controlling the second software to transmit data to a memory so that the data is stored in the memory when it is detected in the step a) that the first software is presently using the input/output port.

Further, there is provided a storage medium storing a program of controlling a use of an input/output port by a plurality of softwares, the program including a program of detecting at least one of a plurality of softwares stored in a first memory, the at least one of the plurality of softwares being designated to use a first input/output port to communicate with the external device via the first input/output port, and a program of setting the at least one of the plurality of softwares into a pending condition.

There is also provided a storage medium storing a program of controlling a use of an input/output port by a plurality of softwares. The program including a program of detecting whether or not a first software is presently using an input/output port to communicate with an external device, a program of controlling a second software to communicate with the external device via the input/output port when it is detected that the first software is not presently communicating with the external device via the input/output port, and a program of controlling the second software to transmit data to a memory so that the data is stored in the memory when it is detected that the first software is presently using the input/output port to communicate with the external device.

BRIEF DESCRIPTION OF THE DRAWINGS

The particular features and advantages of the invention as well as other objects will become more apparent from the following description taken in connection with the accompanying drawings, in which:

FIG. 7 is a flowchart representing processes performed by the scanner driver.

DETAILED DESCRIPTION OF THE PREFERRED EMBODIMENTS

A system according to preferred embodiments of the present invention will be described while referring to the accompanying drawings.

Figure 1:
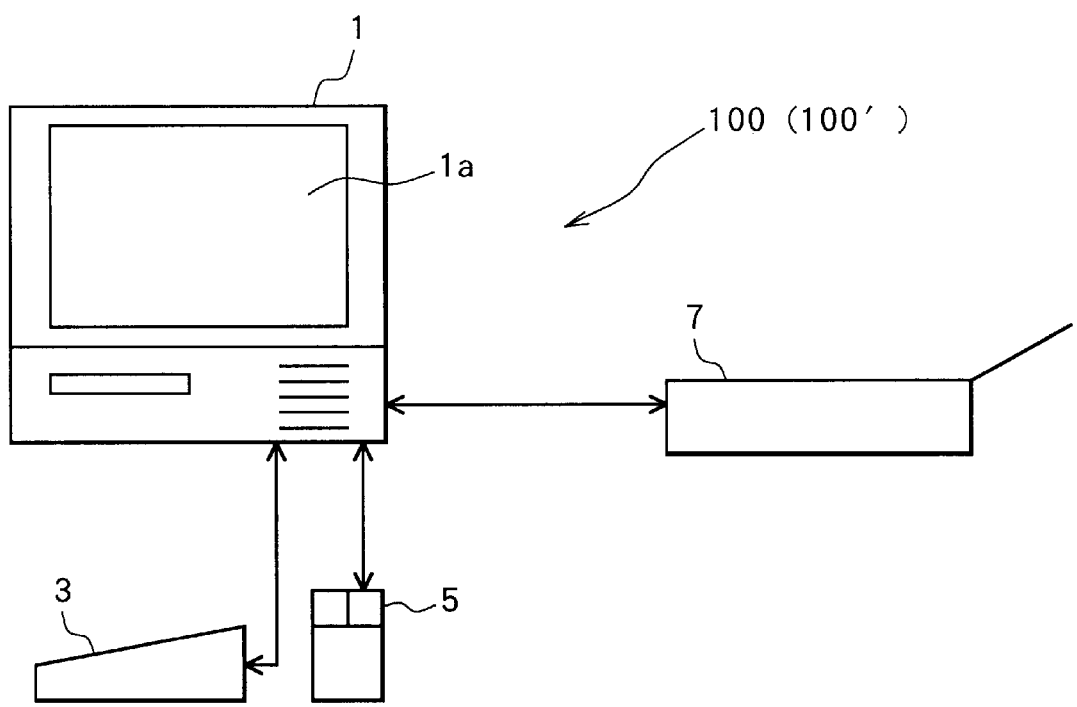
FIG. 1 is a schematic view showing overall configuration of a system according to first and second embodiments of the present invention.

As shown in FIG. 1, a system 100 includes a personal computer 1, a keyboard 3, a mouse 5, and a printer 7. The keyboard 3, the mouse 5, and the printer 7 are individually connected to the personal computer 1. The personal computer 1 is provided integrally with a cathode ray tube (CRT) 1a. Although not shown in the drawings, the personal computer 1 includes a housing, a central processing unit (CPU), a random access memory (RAM), a read only memory (ROM), and a storing memory, such as a hard disk unit. The printer 7 has both a printer function and a scanner function.

Figure 2:
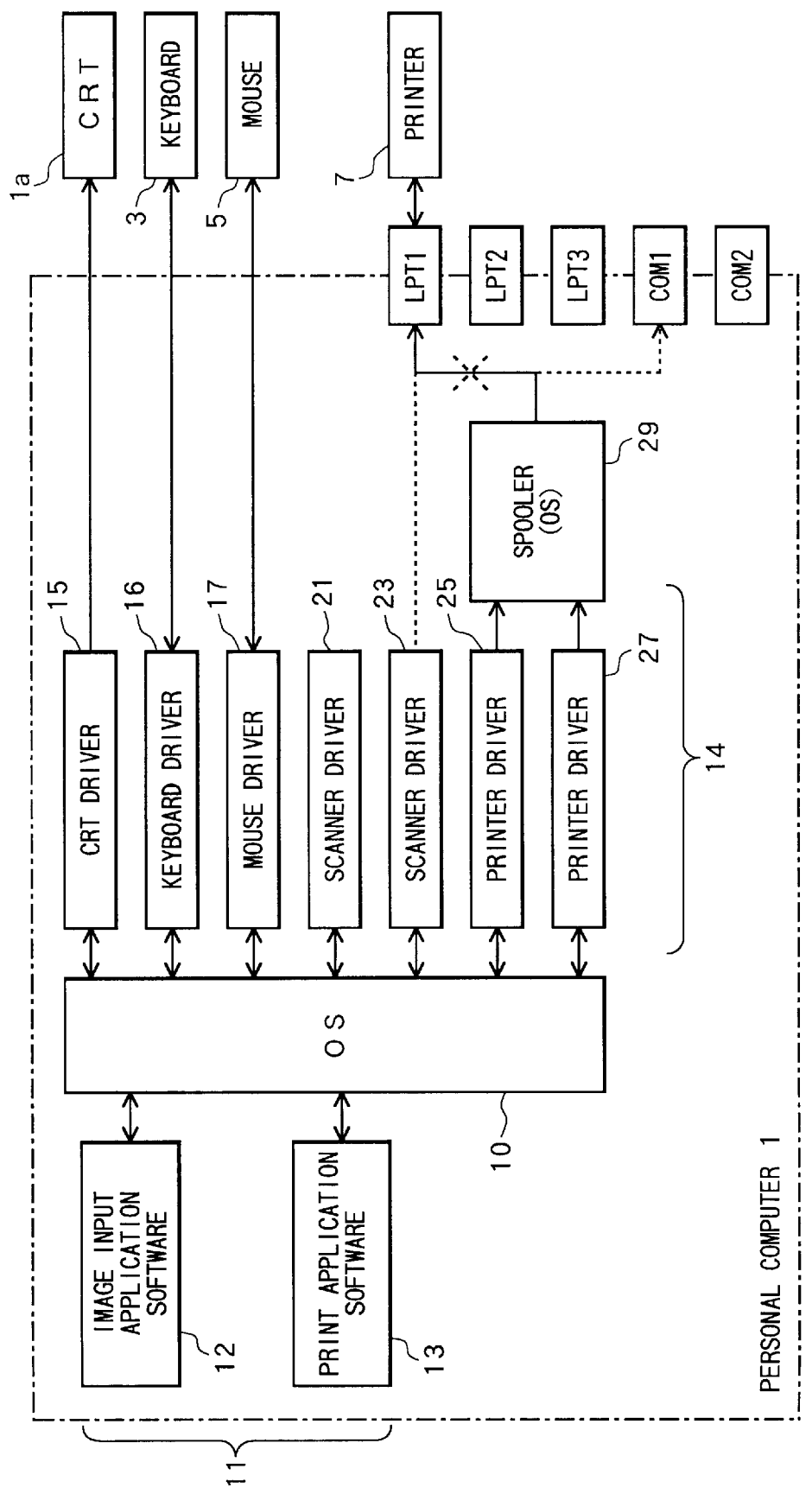
FIG. 2 is a block diagram showing a configuration of softwares and components of the system according to the first embodiment the present invention.

Various kinds of softwares are installed and stored in the storing memory. The software is loaded from the storing unit into the RAM when needed. FIG. 2 shows examples of the softwares stored in the storing memory. The softwares include an operation system 10, application softwares 11, and software drivers 14. The operation system 10 includes a spooler 29. The application softwares 11 are installed in an upper level of the operation system 10 and include an image input application software 12 and a print application software 13. The image input application software 12 is used for driving a scanner to read images. The print application software 13 is used for driving a printer to forming images. The software drivers 14 are installed in the lower level of the operation system 10 and include a CRT driver 15 for driving the CRT 1a, a keyboard driver 16 for driving the keyboard 3, a mouse driver 17 for driving the mouse 5, scanner drivers 21, 23 each for driving a different scanner, and printer drivers 25, 27 each for driving a different type of printer.

The CRT driver 15 is connected to the CRT 1a within the housing of the personal computer 1. The keyboard driver 16 and the mouse driver 17 are connected to the keyboard 3 and the mouse 5, respectively, via exclusive connectors (not shown). The personal computer 1 further includes five input/output ports (hereinafter referred to as "I/O ports") LPT1, LPT2, LPT3, COM1, COM2. The printer 7 is designated to use the I/O port LPT1. Although both the printer drivers 25, 27 are connectable to the I/O port LPT1 via the spooler 29, in this embodiment, only the printer driver 25 is designated to use the I/O port LPT1.

Usually, the spooler 29, that is, the printer driver 25 has an exclusive right to use the I/O port LPT1. In other words, the operation system 10 of the personal computer 1 does not anticipate the I/O port LPT1 being connected to any software drivers other than the printer driver 25. Therefore, the operation system 10 cannot control the spooler 29 to pass the right to use the I/O port LPT1 to the scanner driver 23.

Figure 3:
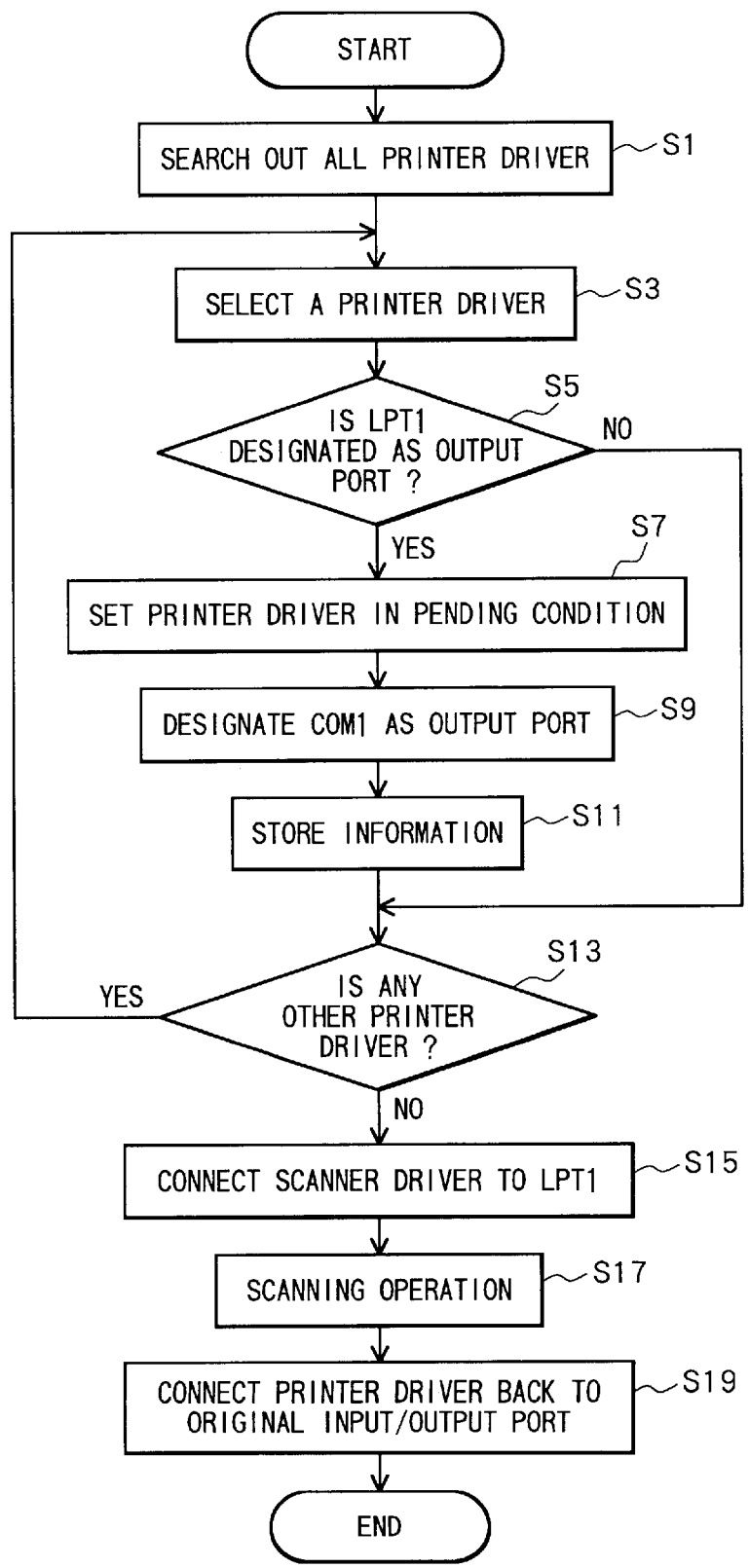
FIG. 3 is a flowchart representing processes performed by a scanner driver of the system of FIG. 2.

In order to solve this problem, the scanner driver 23 executes the following processes represented by the flowchart shown in FIG. 3. These processes are executed when the image input application software 12 outputs a reading command.

When the processes are started, first in S1, all printer drivers 25, 27 are searched out. This search process is executed by the operation system 10 using a well-known method. After the printer drivers 25, 27 have been searched out in S1, one of the printer drivers 25, 27 is selected in S3. Then, it is determined in S5 whether or not the I/O port LPT1, in this example, is designated as an output-port of the selected printer driver. That is, it is determined whether or not the selected printer driver is designated to use the I/O port LPT1. If not (S5:NO), the program proceeds to S13. On the other hand, if the I/O port LPT1 is designated as the output port of the selected printer driver (S5:YES), the program proceeds to S7 wherein the selected printer driver is put into a pending condition. More specifically, the scanner driver 23 controls the operation system 10 to output a pending command to the selected printer driver. It should be noted that if the selected printer driver is transmitting any data to the spooler 29 at this time, the operation system 10 holds outputting the pending command to the selected printer driver until transmission of the data is completed. Upon receiving the pending command, the selected printer driver is set to the pending condition. When the printer driver is in the pending condition, the printer driver does not execute any process. That is, no data is output from the printer driver to the spooler 29.

Next, in S9, the selected printer driver is designated to use the I/O port COM1 via the spooler 29 as indicated by a dotted line L1 in FIG. 2. Then, in S11, information on this change is stored in the RAM. Next, it is determined in S13 whether or not any other printer driver has been searched out in S1. If so (S13:YES), the program returns to S3. If not (S13:NO), this means no software driver is designated to use the I/O port LPT1 and that the I/O port LPT1 is available for any software drivers.

Because, as described above, the operation system 10 anticipates the I/O port LPT1 being used only by the printer drivers 25, 27, the I/O port LPT1 will not be used by any other software drivers. Therefore, only the printer drivers 25, 27 need to be subject to the above-described processes. Therefore, once S13 results in a negative determination, then all software drivers that were designated to use to the I/O port LPT1 have been changed to use the I/O port COM1.

Then, in S15, the scanner driver 23 is designated to use the I/O port LPT1. In S17, the reading command from the image input application software 12 is transmitted to the printer 7 via the scanner driver 23 and the I/O port LPT1, whereby the printer 7 starts performing scanning operations under the control of the scanner driver 23.

After the scanning operation are completed, the program proceeds to S19 wherein the designation on the scanner driver 23 to use the I/O port LPT1 and on the printer drivers to use the I/O port COM1 is canceled, and the printer drivers are re-designated to use the I/O port LPT1 based on the information stored in RAM in S11. Then, the program is ended.

In this way, although the printer 7 with both the scanner function and the printer function is not anticipated by the operation system 10, the scanner driver 23 can use the I/O port LPT1 and to communicate with the printer 7 in a simple manner. Accordingly, when the printer 7 having a plurality of different functions is connected to the personal computer 1, the system 100 of the present invention can properly cope with the different functions of the printer 7.

Further, because the printer driver 25 is automatically re-designated to use the I/O port LPT1 after the scanning operations are completed, the printer driver 25 can quickly and easily restart using the I/O port LPT1.

Next, a system 100' according to a second embodiment of the present invention will be described. The system 100' has the following advantages over the system 100 of the first embodiment.

As described above, when the scanner driver 21 is using the I/O port LPT1 of the system 100, the printer driver 25 is maintained in the pending condition and cannot output any image data. If the printing command is output from the print application software 13 at this time, the operation system 10, which does not anticipate the I/O port LPT1 being used by the scanner driver 23, controls the CRT driver 15 to display an error message on the CRT 1a. This delays overall processes performed by the application softwares 11.

However, the system 100' according to the second embodiment can overcome these problems in the following manner.

Figure 4:
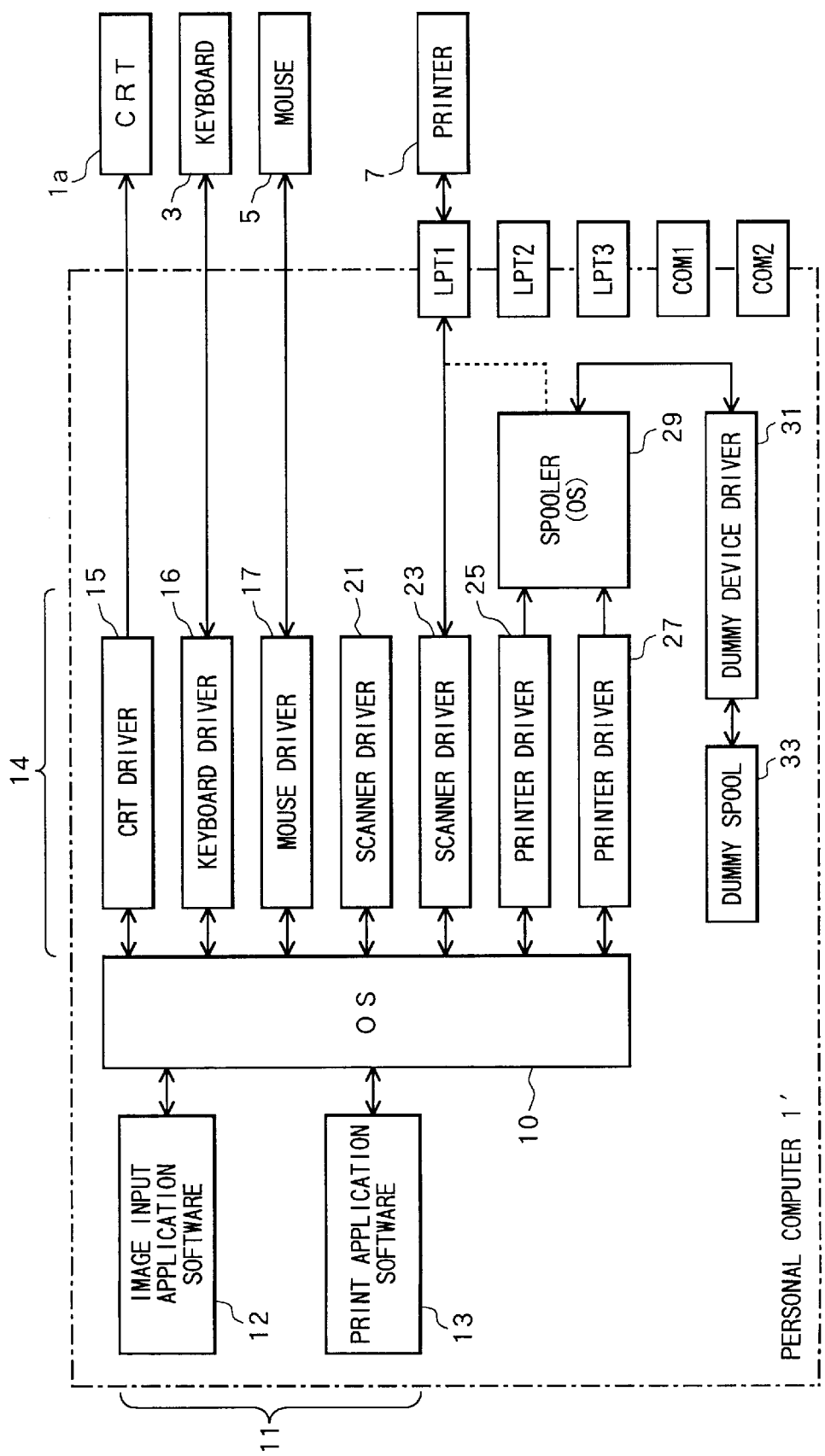
FIG. 4 is a block diagram showing configuration of softwares and components of the system according to the second embodiment of the present invention.

As shown in FIG. 4, a configuration of the system 100' is similar to that of the system 100 of the first embodiment. However, the system 100' further includes a dummy device driver 31 and a dummy spool 33. The dummy spool 33 is connectable with the spooler 29 via the dummy device driver 31. It should be noted that the dummy device driver 31 is a virtual port formed to the RAM and serves an I/O port COM5. The driver softwares 14 are accessible to the dummy spool 33 by using the dummy device driver 31.

In this system 100', when the scanner driver 23 is using the I/O port LPT1, the printer driver 25 is set to be communicable with the dummy spool 33 via the spooler 29 and released from the pending condition. Therefore, when the printing command is output from the print application software 13 under this condition, the printer driver 25 can output image data to the dummy spool 33, and the image data is stored in the dummy spool 33. Then, upon completion of the scanning operations, the image data is output from the dummy spool 33 to the printer 7 via the I/O port LPT1. Then, the printer driver 25 is re-designated to use the I/O port LPT1. Therefore, the CRT driver 15 does not control the CRT 1a to display the error message and the overall processes can be performed by the application softwares 11 without delay.

Figure 5:
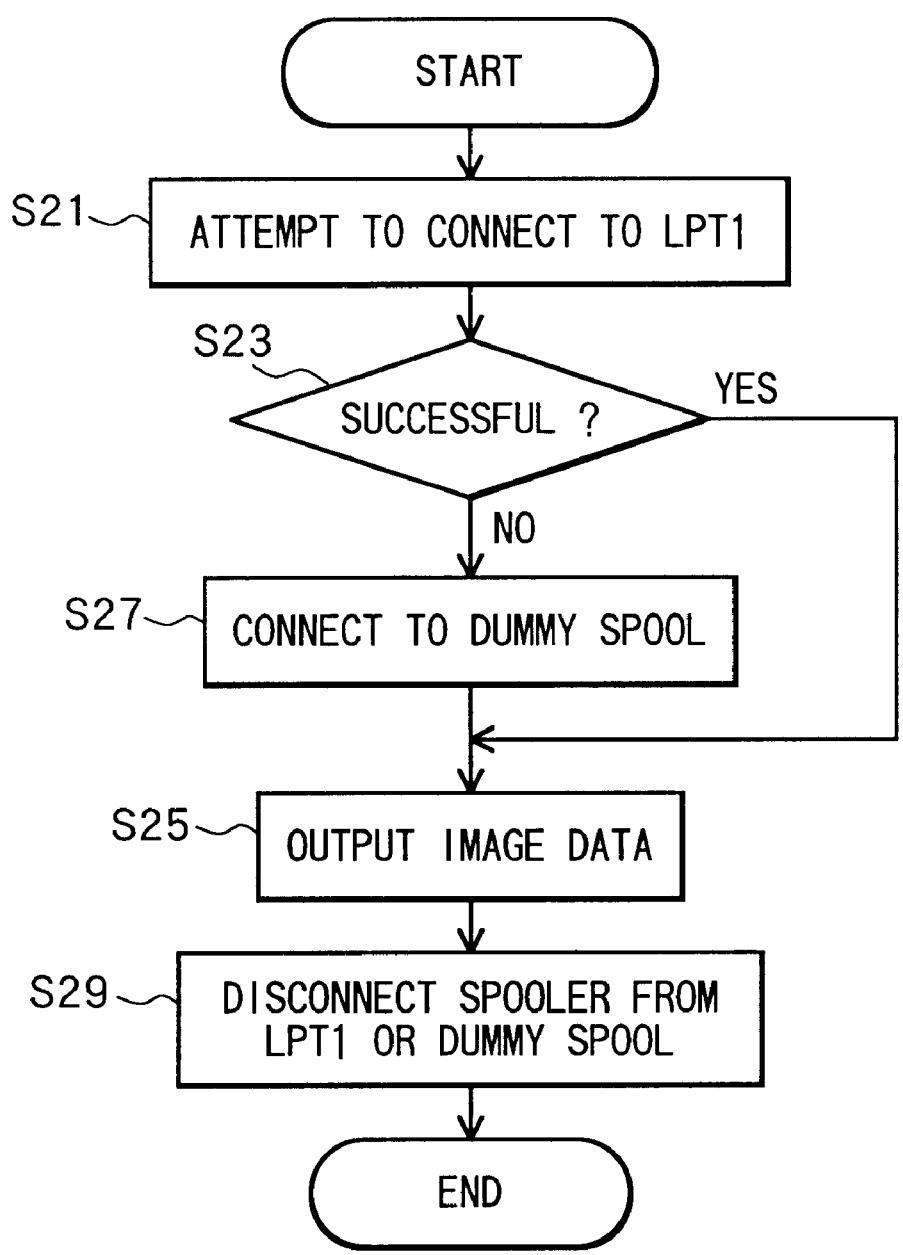
FIG. 5 is a flowchart representing processes performed by a spooler of the system of FIG. 4.

Next, a detailed description of first processes performed in the system 100' will be described wile referring to the flowchart shown in FIG. 5. These processes are executed by the spooler 29 when the printer driver 25 or the printer driver 27 outputs image data in response to a printing command from the image input application software 12. However, in this embodiment, it is assumed that the printer driver 25 outputs image data.

First, it is attempted in S21 to designate the printer driver 25 to use the I/O port LPT1. Then, it is determined in S23 whether or not the printer driver 25 is designated to use the I/O port LPT1. Usually, when the I/O port LPT1 is not being used by any other software drivers, the printer driver 25 can be designated to use the I/O port LPT1. If S23 results in an affirmative determination (S23:YES), the program proceeds to S25 wherein the image data is output from the spooler 29. In this case, the image data output from the spooler 29 is transmitted into the printer 7 via the I/O port LPT1, and the image data is printed out by the printer 7.

On the other hand, if S23 results in a negative determination (S23:NO), this means that the spooler 29 is designated to use the dummy device driver 31 (details will be described later). Then, the program proceeds to S27 wherein the spooler 29 becomes communicable with the dummy spool 33 via the dummy device driver 31. Then, the program proceeds to S25, whereupon the image data is output from the spooler 29. In this case, the image data output from the spooler 29 is input into the dummy spool 33 and stored as a file therein. After the transmission of the image date is completed, designation on the spooler 29 to use either the I/O port LPT1 or the dummy spool 33 is canceled.

In this way, even when the I/O port LPT1 is used by other software driver than the printer driver 25, that is, even when the printer driver 25 cannot output image data to the printer 7 via the I/O port LPT1, the image data can be transmitted to and stored in the dummy spool 33. This prevents display of the error message on the CRT 1a and delay of the overall processes performed by the application softwares 11.

It should be noted that the image data should be transmitted to the dummy spool 33 as slowly as possible without causing display of the error message. In this way, memory capacity of the dummy spool 33 can be conserved to delay a memory full condition as long as possible. Also a plurality of spoolers can be installed onto the operation system and set up individually for corresponding software drivers, and the above-described processes are performed by the spooler 29. Therefore, the system 100' can be established in a simple manner only by slightly modifying a conventional system.

Next, second processes executed in the system 100' will be described while referring to the flowcharts shown in FIG. 6. These processes are executed by the scanner driver 23 when a reading command is output from the image input application software 12.

First, it is attempted in S30 to designate the scanner driver 23 to use the I/O port LPT1. Detailed description of processes executed in S30 will be described later. Next, it is determined in S31 whether or not designation is succeeded in S30. If not (S31:NO), this means that the I/O port LPT1 is being used by other software drivers, so the program returns to S30. On the other hand, if S31 results in an affirmative determination (S31:YES), the scanning operations are performed in S33. More specifically, the scanner driver 23 outputs a signal to the printer 7 in response to the reading command from the image input application software 12 so that the scanning operations are performed by the printer 7. Image data read by the printer 7 during the scanning operations is transmitted via the I/O port LPT1.

Next, in S35, the dummy device driver 31 searches image data that was stored in the dummy spool 33 in S27. Then, it is determined in S37 whether or not any image data is searched out from the dummy spool 33. If so (S37:YES), then in S39, the image data is sent from the dummy spool 33 to the printer 7 via the I/O port LPT1 and printed out by the printer 7. Then, the program proceeds to S41. In S41, designation on the scanner driver 23 to use the I/O port LPT1 is canceled, and based on the information stored in S21 the spooler 29 is designated to use the I/O port LPT1, which the spooler 29 was originally designated to use. On the other hand, if, in S37, no image data is searched out in the dummy spool 33 (S37:NO), the program directly proceeds to S41 without executing S39.

As described above, the image data stored in the dummy spool 33 when the I/O port LPT1 is being used by the scanner driver 23 is sent to the printer 7 and printed out immediately and automatically after the scanning operations are completed. This prevents the memory capacity of the dummy spool 33 from being filled up with data. Also, the processing speed of the image input application software 12 can be improved.

Next, the processes executed in S30 will be described while referring to the flowchart shown in FIG. 7. First, in S51, all printer drivers, that is, the printer drivers 25, 27 in this embodiment, are searched out. Then, in S52, one of the printer drivers 25, 27 is selected. It is determined in S53 whether or not the I/O port LPT1 is designated as the output port of the selected printer driver. That is, it is determined whether or not the selected printer driver is designated to use the I/O port LPT1. If so (S53:YES), it is determined in S54 whether or not the I/O port LPT1 is being used by the selected printer driver. If so (S54:YES), the present program is ended. On the other hand, if the I/O port LPT1 is not being used (S54:NO), the program proceeds to S55 wherein the selected printer driver, in other words, the spooler 29, is set into the pending condition. More specifically, the scanner driver 23 controls the operation system 10 to output a pending command to the selected printer driver. Upon receiving the pending command, the selected printer driver is put into the pending condition wherein no data can be transmitted from the selected printer driver. Then, in S56, the dummy device driver 31 is designated as the output port of the selected printer driver so that the selected printer driver becomes communicable with the dummy spool 33 via the spooler 29 and the dummy device driver 31. Then, in S57, information on this change is stored in the RAM.

Next, in S58, the selected printer driver is released from the pending condition. As a result, the selected printer driver is designated to use the dummy device driver 31 via the spooler 29. Then, it is determined in S59 whether or not any other printer driver is searched out in S51. If so (S59:YES), the program returns to S52. On the other hand, if not (S59:NO), the program proceeds to S60. Therefore, when S59 results in a negative determination, this means that the I/O port LPT1 is not designated as the output port of any printer driver. It should be noted that, as described above, the operation system 10 anticipates the I/O port LPT1 being used only by printer drivers, there is no possibility the I/O port LPT1 being designated to use any other software drivers. Therefore, only the printer drivers 25, 27 need to be subject to the above-described processes. Therefore, when S59 results in a negative determination, all software drivers which were connected to the I/O port LPT1 are changed to use the dummy device driver 31. In this condition, the scanner driver 23 can use the I/O port LPT1.

Then, in S60, the scanner driver 23 is designated to use the I/O port LPT1, and this program is ended.

In this way, although the operation system 10 does not anticipate the I/O port LPT1 being connected to a scanner, the scanner driver 23 can use the I/O port LPT1.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiments, the scanner drivers 21, 23 and the printer drivers 25, 27 are used as examples of software drivers and the printer 7 as of an external device. However, the present invention can be applied to a variety of different fields that perform input and output of data to and from an external device. The present invention can be applied to other software drivers than printers having a scanner function. For example, the present invention can be applied to a multifunction device having a scanner function and a printer function and other functions as well such as a transmission function, such as a facsimile function in addition to a printers having a scanner functions.

Figure 6:
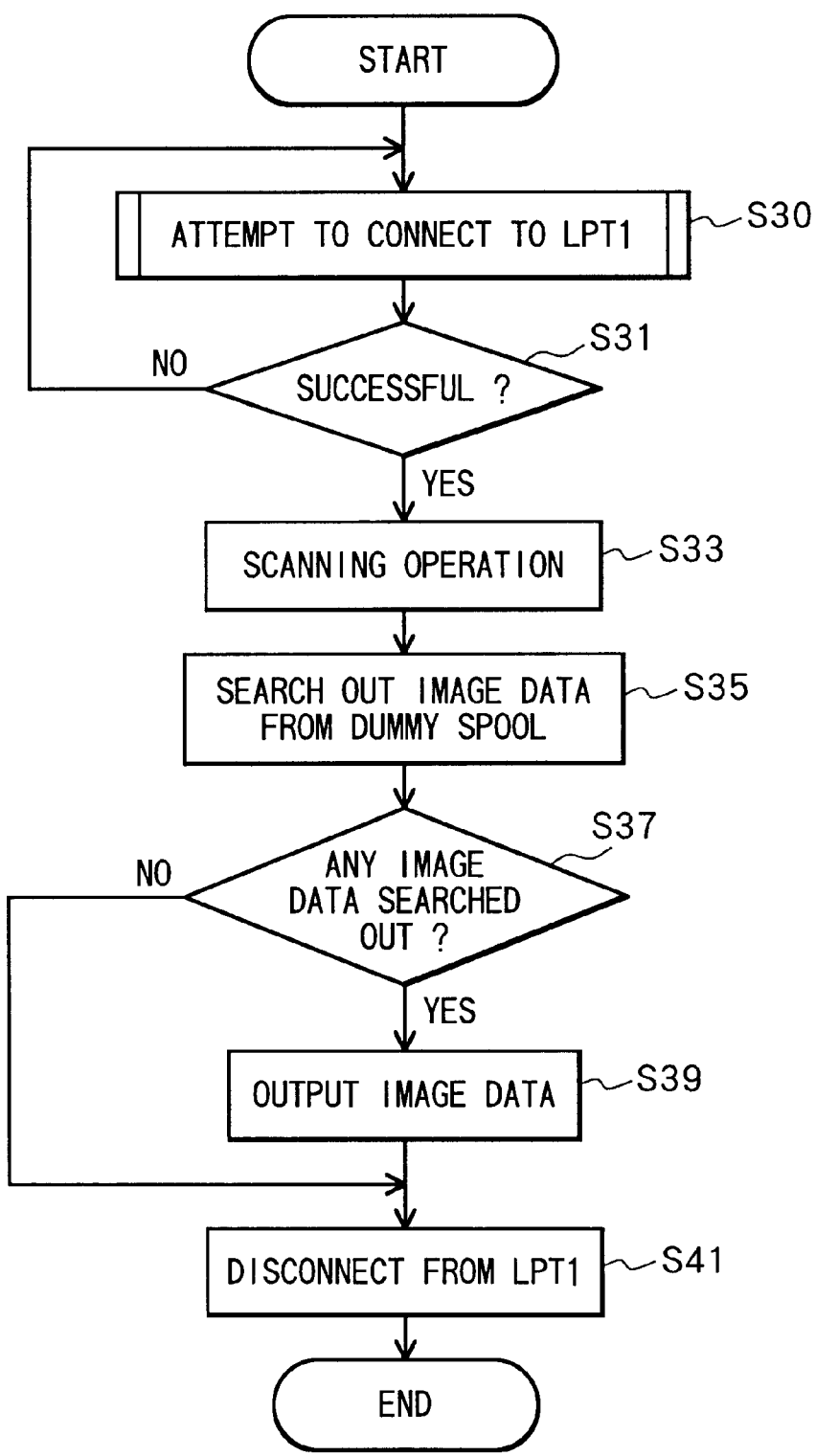
FIG. 6 is a flowchart representing processes performed by a scanner driver of the system of FIG. 4.

Also, in the above-described embodiments, the scanner driver 23 executes various processes shown in the flowcharts in FIGS. 3, 6, and 7 as well as ordinary input/output processes. However, the scanner driver 23 can execute only the input-output processes and a different separate software can be additionally provided for performing these processes other than the input/output processes.

Also, in the above-described second embodiment, only when the selected printer driver is not using the I/O port LPT1 (S54:NO), the selected printer driver is set into the pending state in S17. However, S54 and S31 can be omitted if the operation system 10 has additional following functions. That is, the operation system 10 can have a function to output a rejection signal to the scanner driver 23 when the operation system 10 receives a request to output the pending command while the printer driver is transmitting image data via the I/O port LPT1. In this case, the scanner driver 23 repeatedly outputs the request to output the pending command until, after the transmission of the image data is completed, the request is finally accepted by the operation system 10. Alternatively, while data is being transmitted, the operation system 10 can be designed to receive the request for pending command without outputting any rejection signal. After the transmission of the image data is completed, the operation system 10 can then output the pending command to the printer driver 25.

Further, the scanner driver 23 and the spooler 29 can be optionally provided to the printer 7 using a floppy disk or a CD ROM. Also the scanner driver 23 can be stored in a memory device such as the hard disk of the personal computer 1 over a transmission circuit such as the internet.

What is claimed is:

1. A data transmission device comprising:
a first memory that stores a plurality of softwares;
a first input/output port that is connectable to an external device having a plurality of functions including a first function and a second function, wherein at least one of the plurality of softwares is designed to exclusively use the first input/output port to achieve the first function of the external devices;
detecting means for detecting the at least one of the plurality of softwares, wherein the detecting means detects if the at least one plurality of softwares is designed to exclusively use or is currently using the first input/output port;
pending means for setting the at least one of the plurality of softwares detected by the detecting means into a pending condition; and
control means for controlling another at least one of the plurality of softwares to use the first input/output port to achieve the second function of the external device when the at least one of the plurality of softwares is in the pending condition.

2. The data transmission device according to claim 1, further comprising releasing means for releasing the at least one of the plurality of softwares from the pending condition when the another at least one of the plurality of softwares completes communicating with the external device.

3. The data transmission device according to claim 1, further comprising a second input/output port, wherein the control means controls the at least one of the plurality of softwares to use the second input/output port when the another at least one of the plurality of software is communication with the external device via the first input/output port.

4. The data transmission device according to claim 1, further comprising a second memory, wherein when the another at least one of the plurality of software is communicating with the external device via the first input/output port, the at least one of the plurality of softwares transmits data to the second memory to be stored therein.

5. The data transmission device according to claim 4, wherein when the data is detected in the second memory after the another at least one of the plurality of softwares completes communicating with the external device via the first input/output port, the data is output from the second memory to the external device via the first input/output port.

6. A data transmission device comprising:
　a first memory that stores a first software and a second software;
　a second memory that stores data;
　an input/output port that is connectable with an external device, wherein the first software and the second software are communicable with the external device via the input/output port; and
　detecting means for detecting whether or not the first software is presently using the input/output port to communicate with the external device, wherein the second software transmits data to the external device via the input/output port when the first software is not presently using the input/output port, and the second software transmits data to the second memory to store the data into the second memory when the first software is presently using the input/output port.

7. The data transmission device according to claim 6, wherein data is detected in the second memory after the first software completes communicating with the external device, the data is transmitted to the external device via the input/output port.

8. A method of controlling a use of an input/output port that is connectable to an external device having a plurality of functions including a first function and a second function by a plurality of softwares, the method comprising the steps of:
　a) detecting at least one of a plurality of softwares stored in a first memory, the at least one of the plurality of softwares being designed to exclusively use a first input/output port to achieve the first function of the external device, wherein the detecting means detects if the at least one plurality of softwares is designed to exclusively use or is currently using the first input/output port;
　b) setting the at least one of the plurality of softwares detected in step a) into a pending condition; and
　c) controlling a control means to control another at least one of the plurality of softwares to use the first input/output port to achieve the second function of the external device when the at least one of the plurality of softwares is in the pending condition.

9. The method according to claim 8, further comprising the step of d) designating the at least one of the plurality of softwares to use a second input/output port.

10. The method according to claim 9, further comprising the step of e) designating another at least one of the plurality of softwares to use the first input/output port when the at least one of the plurality of softwares is in the pending condition.

11. The method according to claim 10, further comprising the step of f) controlling the another at least one of the plurality of softwares to communicate with the external device via the first input/output port.

12. The method according to claim 11, further comprising the step of g) releasing the at least one of the plurality of softwares from the pending condition after the another at least one of the plurality of softwares completes communicating with the external device.

13. The method according to claim 11, further comprising the steps of h) controlling the at least one of the plurality of softwares to transmit data to a second memory with using the second input/output port when the another at least one of the plurality of softwares is communicating with the external device via the first input/output port, and i) storing the data transmitted form the at least one of the plurality of softwares into the second memory.

14. The method according to claim 13, further comprising the step of j) transmitting data from the second memory to the external device via the first input/output port when the data is detected in the second memory after the another at least one of the plurality of softwares completes communicating with the external device via the first input/output port.

15. A method of controlling a use of an input/output port by a plurality of softwares, the method comprising the steps of:
　a) detecting whether or not a first software is presently using an input/output port to communicate with an external device;
　b) controlling a second software to communicate with the external device via the input/output port when it is detected in the step a) that the first software is not presently using the input/output; and
　c) controlling the second software to transmit data to a memory so that the data is stored in the memory when it is detected in the step a) that the first software is presently using the input/output port.

16. The method according to claim 15, further comprising the steps of d) transmitting data to the external device via the input/output port when the data is detected in the memory after the first software completes communicating with the external device via the input/output port.

17. A storage medium storing a program of controlling a use of an input/output port that is connectable to an external device having a plurality of functions including a first and a second function by a plurality of softwares, the program comprising:
　a program of detecting at least one of a plurality of softwares stored in a first memory, the at least one of the plurality of softwares being designed to exclusively use a first input/output port to achieve the first function of the external device, wherein the detection program detects if the at least one plurality of softwares is designed to exclusively use or is currently using the first input/output port;
　a program of setting the at least one of the plurality of softwares into a pending condition; and
　a program for controlling a control means for controlling at leas one of the plurality of softwares to use the first input/output port to achieve the second function of the external device when the at least one of the plurality of softwares is in the pending condition.

18. The storage medium according to claim 17, wherein the program further comprises a program of designating the at least one of the plurality of softwares to use a second input/output port.

19. The storage medium according to claim 18, wherein the program further comprises a program of designating another at least one of the plurality of softwares to use the first input/output port when the at least one of the plurality of softwares is in the pending condition.

20. The storage medium according to claim 19, wherein the program further comprises a program of controlling the another at least one of the plurality of softwares to communicate with the external device via the first input/output port.

21. The storage medium according to claim 20, wherein the program further comprises a program of releasing the at least one of the plurality of softwares from the pending condition after the another at least one of the plurality of softwares completes communicating with the external device.

22. The storage medium according to claim 20, wherein the program further comprises a program of transmitting data from the at least one of the plurality of softwares to a second memory with using the second input/output port when the another at least one of the plurality of softwares is using the first input/output port to communicate with the external device, and a program of storing the data transmitted form the at least one of the plurality of softwares into the second memory.

23. The storage medium according to claim 22, wherein the program further comprises a program of transmitting data from the second memory to the external device via the first input/output port when the data is detected in the second memory after the another at least one of the plurality of softwares completes communicating with the external device via the first input/output port.

24. A storage medium storing a program of controlling a use of an input/output port by a plurality of softwares, the program comprising:

a program of detecting whether or not a first software is presently using an input/output port to communicate with an external device;

a program of controlling a second software to communicate with the external device via the input/output port when it is detected that the first software is not presently communicating with the external device via the input/output port; and a program of controlling the second software to transmit data to a memory so that the data is stored in the memory when it is detected that the first software is presently using the input/output port to communicate with the external device.

25. The storage medium according to claim 24, wherein the program further comprises a program of transmitting the data to the external device via the input/output port if the data is detected in the memory when the first software completes communicating with the external device via the input/output port.

* * * * *